Patented June 8, 1926.

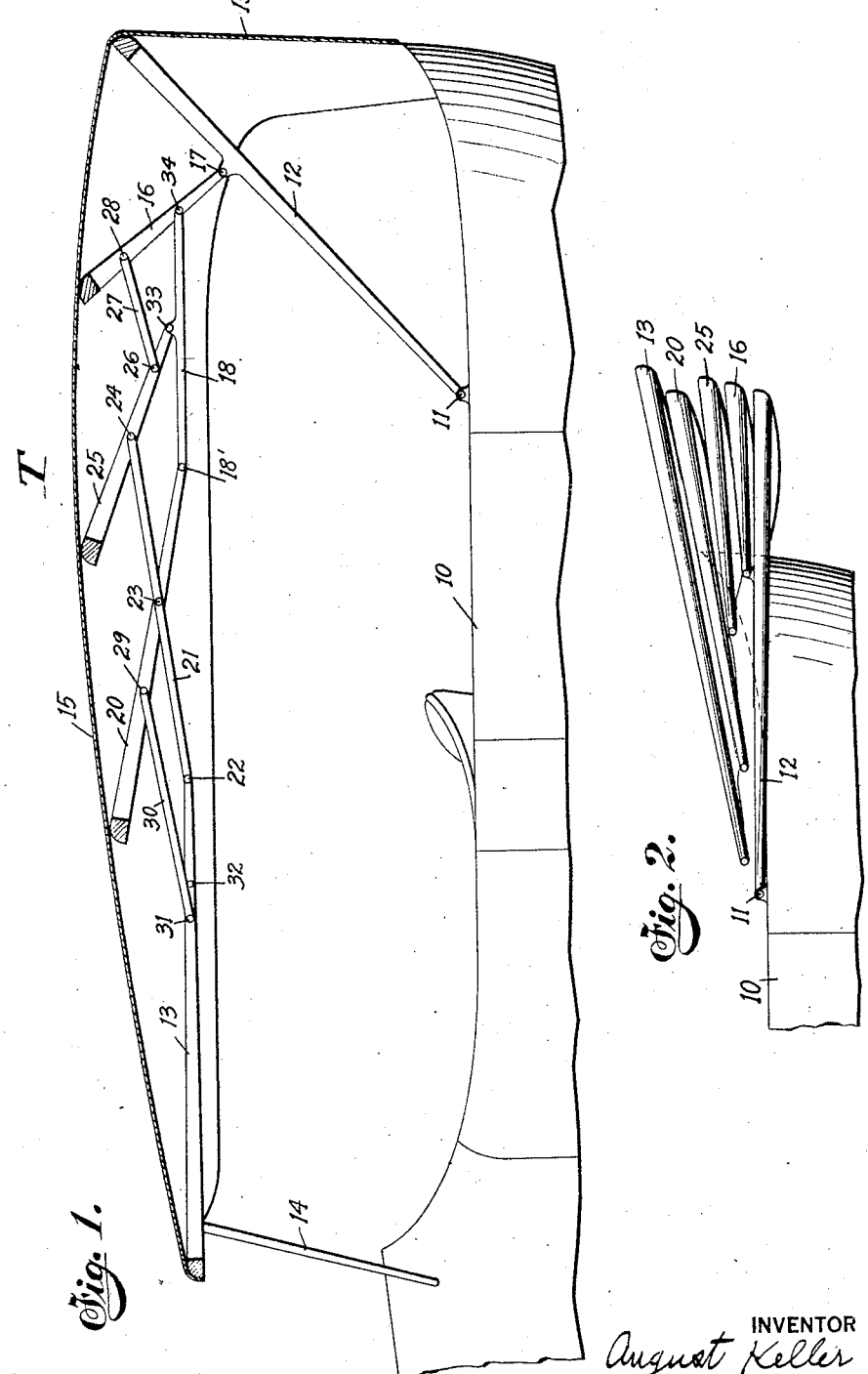

1,588,235

UNITED STATES PATENT OFFICE.

AUGUST KELLER, OF NEW YORK, N. Y., ASSIGNOR TO GOLDE-PATENT MANUFACTURING CO., INC., OF NEW YORK, N. Y., A CORPORATION OF NEW YORK.

FOLDABLE TOP FOR VEHICLES.

Application filed October 22, 1921, Serial No. 509,559. Renewed November 18, 1925.

My present invention relates to folding tops for vehicles, particularly motor vehicles, such as automobiles, and aims to provide tops of the character described which shall be neat and compact when in folded position, which are simple and economical in construction, and convenient to move from folded into extended position and vice versa, and which are neat and rigid in extended position.

In the accompanying specification and drawings I have described and shown an illustrative embodiment of the present invention. In said drawings Figure 1 is a longitudinal section partly in elevation of the top in extended position; and Figure 2 is a side elevation of the same in folded position.

Referring to said illustrative embodiment, 10 indicates the body of the vehicle, such as the automobile body, to which the folding top, generally indicated by reference character T, is attached. The folding top T, which is of the type generally referred to in the trade as the "one-man" type of top, comprises a main bow 12 pivoted to the body of the vehicle 10 as at 11. In the embodiment shown it will be noted that the main bow 12 is rearwardly inclined and that the other bows, here shown to be four in number, are so disposed as to allow all passengers in the car clear and unobstructed vision out of the same. This arrangement also permits easier and more unobstructed entry and egress out of the car, as there are no forwardly inclined or even vertical bows to obstruct free entrance and egress. 13 indicates the front or outrigger bow, the forward end of which, in the extended position of the top, rests on or may be fastened to the top or extensions of the windshield 14. The front or outer portions of the front bow 13, as of the other bows 12, 20, 25 and 16, are attached to the top cover material 15 which at its rear end is fastened to the body 10.

Pivoted to the main bow 12, at the point 17, is a rear bow 16. Pivoted to the rear bow 16 is a main strut 18 pivoted to said bow at 34. There is also provided a rear strut 27, which is pivoted to the rear bow 16 as at 28. At 25 there is shown an auxiliary bow which is pivoted to the main strut 18 at 33, at a point intermediate the ends of the main strut. The auxiliary bow 25 is pivoted to the forward end 26 of the rear strut 27.

At 20 is indicated the intermediate bow which is pivoted to the forward end 18' of the main strut 18. The intermediate bow 20 is also pivoted as at 23 to a substantially central point of the intermediate strut whose rear end is pivoted to the auxiliary bow at 24, and whose forward end is pivoted to the rear end 22 of the front or outrigger bow 13. There is also provided a front strut 30 pivoted at its rear end 29 to the intermediate bow 20, at a point above the pivot 23 between said bow and the intermediate strut 21. The front end 31 of the front strut 30 is pivoted to the front bow 13 at a point somewhat in advance of the rear end 22 of the front strut.

In order to render the forward portion of the top substantially rigid in the extended position of the same, I provide the front bow 13 with a pin or other suitable stop 32, which cooperates with the front strut 30 in the extended position of the top to lock the top in strong, rigid condition when the same is open.

The operation of the top into folded and extended positions is substantially as follows: Assuming that the top is in the extended position shown in Figure 1 of the drawings, the engagement between the intermediate strut 30 and the pin 32, together with the supporting action of the windshield 14 on the front of the outrigger bow 13, and the fastenings between the top cover material 15 and the outer ends of the bows 13, 20, 25, 16 and 12, cooperating further with the particular arrangement of bows and struts, serves to give the top in extended position the necessary strength and rigidity.

In moving the top from open to closed or folded position the operator grasps the forward end of the front bow 13 and raises the same so as to bring the pin 32 out of engagement with the front link 30. The arrangement of bows and struts is such that this action of the operator starts the folding movement of all of the bows and struts with respect to the main bow 12. In other words the folding operation of the various bows and struts with respect to the main bow 12 takes place in a single stage, since the bows and struts are so linked together that the action of the operator in raising the front bow 13 is communicated to all the other bows and struts except the main bow 12. When the bows 13, 20, 25 and 16 have been moved into folded position, together with their associated struts, with respect to the bow 12, all of the bows may then be moved by pivotal action to occupy the position shown in Figure 2 of the drawings. The folding operation is thus completed. In unfolding the top the series of operations just described is repeated in the reverse order.

The advantages of the foregoing construction are numerous and of great practical importance. When in extended position the top makes a very neat appearance and is rigid, being locked at two points. During the folding or unfolding operation, due to the arrangement of the bows and struts employed, the folding or unfolding operation is accomplished in a single stage and the parts are so disposed as to permit the very easy and convenient manipulation of the top into folded or open position. At the same time the arrangement is such that the front bow during the folding or unfolding operation, as the case may be, will not extend below the lower extremity of the main bow and will not therefore touch the vehicle body and thus damage the finish of the same. In folded position the top presents a very neat appearance and the rear ends of the folded bows line up in such a way as to permit the use of a well-shaped top or dust hood.

It is of course to be understood that my invention is not limited to the specific embodiment thereof herein shown and described for purposes of illustration only.

What I claim is:

1. In combination with a master bow pivoted to a vehicle body having a folding vehicle top, a rear bow pivoted to said master bow, a rear strut and a main strut pivoted to said rear bow at spaced distances from each other, an auxiliary bow pivoted to said rear strut at the forward end thereof and to said main strut at an intermediate portion thereof, an intermediate bow pivoted to said main strut at the forward end thereof, an intermediate strut pivoted to said auxiliary bow and to said intermediate bow, a front strut also pivoted to said intermediate bow, and a front bow pivoted to said front and intermediate struts at the forward ends of the same.

2. In combination with a main bow pivoted to the body of a vehicle having a folding vehicle top, a rear bow pivoted to said main bow, a rear strut and a main strut pivoted to said rear bow at spaced distances from each other, an auxiliary bow pivoted to said rear strut at the forward end thereof and to said main strut at an intermediate portion thereof, an intermediate bow pivoted to said main strut at the forward end thereof, an intermediate strut pivoted to said auxiliary bow and to said intermediate bow, a front strut also pivoted to said intermediate bow, a front bow pivoted to said front and intermediate struts at the forward ends of the same, and a stop on said front bow cooperating with the front strut for locking the forward portion of the top in extended position.

In testimony whereof, I have signed my name to this specification this 8th day of October 1921.

AUGUST KELLER.